(12) United States Patent
Shimizu et al.

(10) Patent No.: US 9,789,779 B2
(45) Date of Patent: Oct. 17, 2017

(54) REGIONAL CHARGING CONTROL SERVICE

(71) Applicant: TOYOTA JIDOSHA KABUSHIKI KAISHA, Toyota-shi, Aichi-ken (JP)

(72) Inventors: Takayuki Shimizu, Mountain View, CA (US); Akihisa Yokoyama, Toyota (JP); Kunihiko Kumita, Toyota (JP); Tomoya Ohno, Toyota (JP)

(*) Notice: Subject to any disclaimer, the term of this patent is extended or adjusted under 35 U.S.C. 154(b) by 618 days.

(21) Appl. No.: 14/467,701

(22) Filed: Aug. 25, 2014

(65) Prior Publication Data

US 2016/0052413 A1    Feb. 25, 2016

(51) Int. Cl.
*B60L 11/18* (2006.01)
*H04W 4/04* (2009.01)
(Continued)

(52) U.S. Cl.
CPC ......... *B60L 11/1824* (2013.01); *B60L 11/184* (2013.01); *B60L 11/1844* (2013.01); *B60L 11/1846* (2013.01); *G05B 15/02* (2013.01); *G06Q 10/06* (2013.01); *G06Q 50/06* (2013.01); *H02J 3/00* (2013.01); *H04W 4/027* (2013.01); *H04W 4/028* (2013.01); *H04W 4/046* (2013.01); *B60L 2240/70* (2013.01); *B60L 2250/14* (2013.01); *B60L 2260/52* (2013.01); *B60L 2260/58* (2013.01); *Y02E 60/721* (2013.01); *Y02T 10/7005* (2013.01);
(Continued)

(58) Field of Classification Search
None
See application file for complete search history.

(56) References Cited

U.S. PATENT DOCUMENTS 9,209,623 B1* 12/2015 Sortomme ............... H02J 3/14
2009/0091291 A1* 4/2009 Woody ..................... B60K 6/48
320/109
(Continued)

FOREIGN PATENT DOCUMENTS

EP    2 497 678 A2    9/2012
EP    2 759 977 A1    7/2014
WO    2013045449 A2    4/2013

OTHER PUBLICATIONS

International Search Report and Written Opinion, as issued in connection with International Patent Application No. PCT/JP2015/000638, dated May 27, 2015, 10 pgs.

*Primary Examiner* — Isaac T Tecklu
(74) *Attorney, Agent, or Firm* — Burbage Law, P.C.; Jon-Michael Burbage; Elizabeth Ruzich

(57) ABSTRACT

The disclosure includes a system and method for providing charging services to mobile client devices. The system includes a processor and a memory storing instructions that, when executed, cause the system to: receive demand response event data associated with a geographic region; determine a last-mile distribution network that includes a first endpoint in the geographic region, the first endpoint associated with a mobile client device; estimate one or more last-mile power usage factors describing power usage of a set of endpoints in the last-mile distribution network, the set of endpoints including the first endpoint associated with the mobile client device; and determine a charge schedule for the mobile client device based on the demand response event data and the one or more last-mile power usage factors.

22 Claims, 7 Drawing Sheets

(51) Int. Cl.
  *H04W 4/02* (2009.01)
  *H02J 3/00* (2006.01)
  *G05B 15/02* (2006.01)
  *G06Q 10/06* (2012.01)
  *G06Q 50/06* (2012.01)

(52) U.S. Cl.
  CPC ........ *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | |
|---|---|---|---|
| 2010/0017249 A1* | 1/2010 | Fincham | B60L 3/12 705/412 |
| 2010/0076825 A1* | 3/2010 | Sato | B60L 3/12 705/14.1 |
| 2010/0094496 A1* | 4/2010 | Hershkovitz | B60L 3/12 701/22 |
| 2010/0211340 A1* | 8/2010 | Lowenthal | B60L 11/1816 702/63 |
| 2010/0280675 A1* | 11/2010 | Tate, Jr. | H01M 10/44 700/295 |
| 2011/0224852 A1* | 9/2011 | Profitt-Brown | B60L 11/1824 701/22 |
| 2012/0200260 A1* | 8/2012 | Karner | H01M 10/44 320/109 |
| 2012/0235646 A1* | 9/2012 | Lo | H02J 7/0027 320/137 |
| 2012/0253567 A1* | 10/2012 | Levy | B60L 11/1844 701/22 |
| 2012/0274440 A1* | 11/2012 | Meadows | G01V 1/008 340/3.42 |
| 2013/0046411 A1* | 2/2013 | Al Faruque | H02J 3/32 700/286 |
| 2013/0103378 A1* | 4/2013 | Tinnakornsrisuphap | G06F 17/5009 703/18 |
| 2013/0110296 A1* | 5/2013 | Khoo | B60L 11/1825 700/286 |
| 2013/0119920 A1* | 5/2013 | Hsu | B60L 11/1844 320/106 |
| 2013/0211988 A1* | 8/2013 | Dorn | B60L 11/1838 705/35 |
| 2013/0257372 A1* | 10/2013 | Chen | B60L 11/1816 320/109 |
| 2014/0005847 A1* | 1/2014 | Melen | G06F 1/28 700/291 |
| 2014/0005848 A1* | 1/2014 | Melen | G06Q 10/101 700/291 |
| 2014/0006137 A1* | 1/2014 | Melen | G06Q 10/1093 705/14.35 |
| 2014/0077762 A1* | 3/2014 | Spanos | B60L 11/1816 320/109 |
| 2014/0225564 A1* | 8/2014 | North | B60L 11/1842 320/109 |
| 2014/0304025 A1* | 10/2014 | Steven | G06Q 10/06314 705/7.24 |
| 2014/0354227 A1* | 12/2014 | Tyagi | B60L 11/1844 320/109 |
| 2015/0039391 A1* | 2/2015 | Hershkovitz | G06Q 10/04 705/7.31 |
| 2015/0066224 A1* | 3/2015 | Uyeki | H02J 7/0027 700/291 |
| 2015/0170176 A1* | 6/2015 | Doms | G06Q 50/06 705/7.35 |
| 2017/0036560 A1* | 2/2017 | Schuelke | B60L 11/1816 |

\* cited by examiner

REGIONAL CHARGING CONTROL SERVICE

BACKGROUND

The specification relates to charging mobile client devices. In particular, the specification relates to managing charging services for mobile client devices in a geographical region.

As more and more people favor clean and sustainable energy, the usage of electric vehicles and/or hybrid electric vehicles grows dramatically. Existing charging solutions may include charging a vehicle wirelessly or using a charging cable when the vehicle is connected to a power source. Existing charging solutions may fail to consider other factors that may affect the charging of the vehicle. For example, existing charging solutions may fail to balance a load placed on a power grid in a geographic region if a number of vehicles are charged at the same time.

SUMMARY

According to one innovative aspect of the subject matter described in this disclosure, a system for providing charging services to mobile client devices includes one or more processors and one or more non-transitory tangible computer readable mediums communicatively coupled to the one or more processors and storing executable instructions executable by the one or more processors to perform operations including: receiving demand response event data associated with a geographic region; determining a last-mile distribution network that includes a first endpoint in the geographic region, the first endpoint associated with a mobile client device; estimating one or more last-mile power usage factors describing power usage of a set of endpoints in the last-mile distribution network, the set of endpoints including the first endpoint associated with the mobile client device; and determining a charge schedule for the mobile client device based on the demand response event data and the one or more last-mile power usage factors.

In general, another innovative aspect of the subject matter described in this disclosure may be embodied in methods that include: receiving demand response event data associated with a geographic region; determining a last-mile distribution network that includes a first endpoint in the geographic region, the first endpoint associated with a mobile client device; estimating one or more last-mile power usage factors describing power usage of a set of endpoints in the last-mile distribution network, the set of endpoints including the first endpoint associated with the mobile client device; and determining a charge schedule for the mobile client device based on the demand response event data and the one or more last-mile power usage factors.

Other aspects include corresponding methods, systems, apparatus, and computer program products for these and other innovative aspects.

These and other implementations may each optionally include one or more of the following operations and features. For instance, the operations include: receiving data describing a utility charging preference of a utility service; receiving data describing a user charging preference of a user associated with the mobile client device; determining the charge schedule for the mobile client device further based on the utility charging preference and the user charging preference; performing a negotiation process between the set of endpoints within the last-mile distribution network to keep a total load in the last-mile distribution network below a threshold; determining the charge schedule further based on a negotiation result from the negotiation process; increasing a first reward value associated with the second endpoint based on the amount of power saved by the second endpoint; and reducing a second reward value associated with the first endpoint based on the amount of power.

For instance, the features include: receiving a prioritized signal from the first endpoint associated with the mobile client device, the prioritized signal indicating to charge the mobile client device during a time period; determining a second endpoint in the last-mile distribution network that agrees to reduce power usage during the time period responsive to the prioritized signal; estimating an amount of power saved by the second endpoint during the time period; generating the negotiation result that includes the amount of power saved by the second endpoint; the charge schedule using the amount of power saved by the second endpoint to charge the mobile client device; and the demand response event data including time-of-use pricing data, peak time rebate data, and direct load control data.

The disclosure is particularly advantageous in a number of respects. For example, the system described herein may manage the charging services of numerous vehicles connected to a power grid in a geographic region. The costs of charging the vehicles may be reduced and the load placed on the power grid may be balanced. The system may also manage the charging of the vehicles based on demand response (DR) event data from a utility server. The system may control the charging of the vehicles based on preferences of a power grid operator and preferences of individual users associated with the vehicles. A charge schedule for each individual vehicle may satisfy both a user's charging preferences and the power grid operator's charging preferences. A user's charging preference may include, but is not limited to: (1) having the vehicle charged to a target state of charge; (2) having the vehicle charged to the target state of charge before a journey departure time; and (3) having the vehicle charged with the lowest cost. The power grid operator's charging preferences may include, but is not limited to: (1) reducing the peak load on the power grid; and (2) leveling the load placed on the power grid. The charge schedules may vary ampere rates for charging the vehicles so that the power grid may not be overloaded by the charging of the vehicles. The advantages of the system described herein are provided by way of example, and the system may have numerous other advantages.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

System Overview

Figure 1:
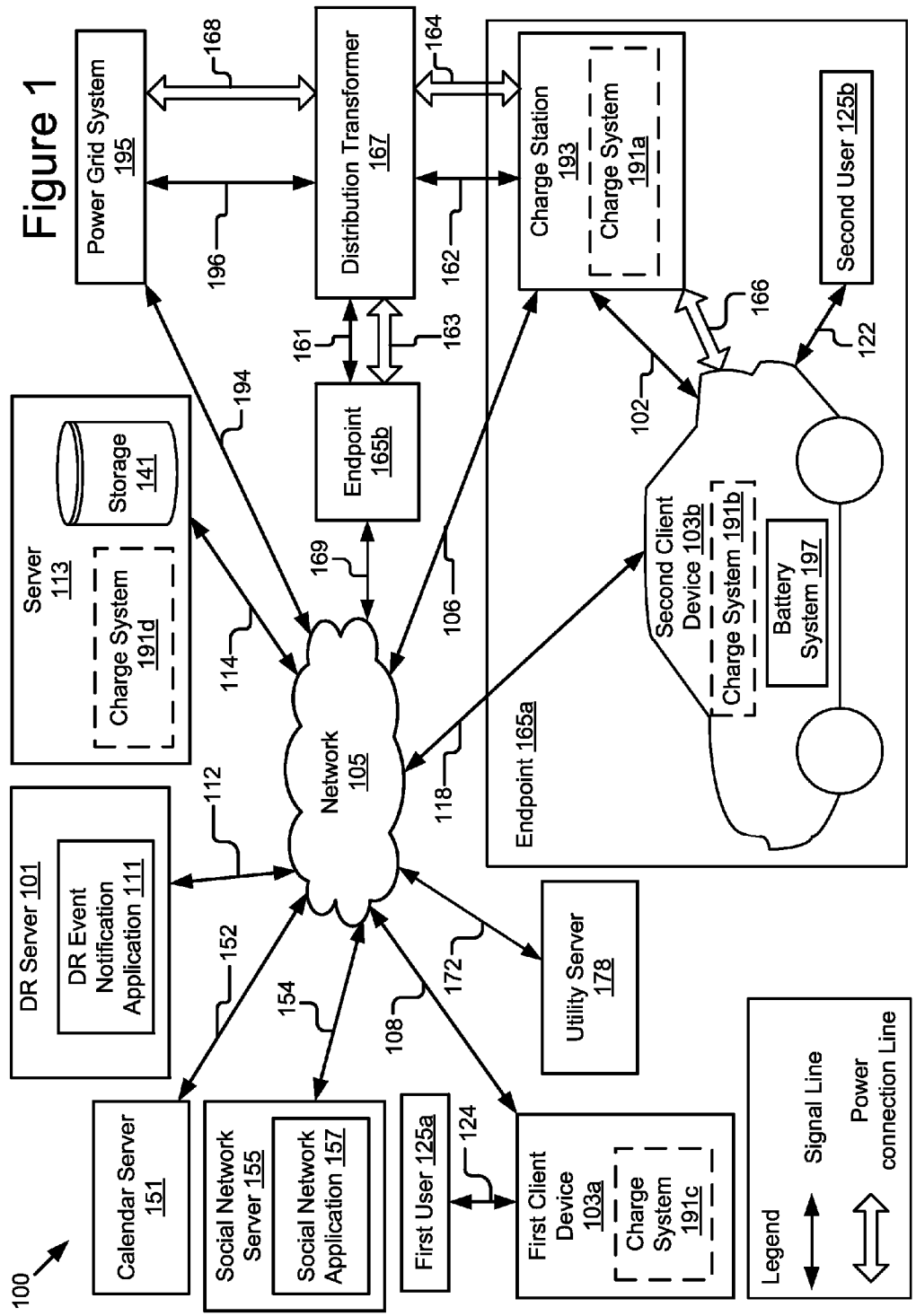
FIG. 1 is a block diagram illustrating an example system for providing charging services to mobile client devices.

FIG. 1 illustrates a block diagram of some implementations of a system 100 for providing charging services to mobile client devices. The system 100 includes a demand response (DR) server 101, a server 113, a calendar server 151, a social network server 155, a utility server 178, a power grid system 195, a distribution transformer 167, endpoints 165a and 165b (also referred to herein individually and collectively as endpoint 165), and a first client device 103a. The endpoint 165a may include a charge station 193 and a second client device 103b. The first client device 103a and the second client device 103b may be referred to herein individually and collectively as client device 103. The first client device 103a and the second client device 103b may be accessed by users 125a and 125b (also referred to herein individually and collectively as user 125), respectively. In the illustrated implementation, these entities of the system 100 may be communicatively coupled via a network 105. The system 100 may include other servers or devices not shown in FIG. 1 including, for example, a traffic server for providing traffic data, a weather server for providing weather data, and a map server for providing map data, etc.

Although FIG. 1 illustrates one network 105 coupled to the entities of the system 100, in practice one or more networks 105 can be connected to these entities. While FIG. 1 includes one DR server 101, one server 113, one calendar server 151, one social network server 155, two client devices 103, two endpoints 165, one utility server 178, one distribution transformer 167, and one power grid system 195, the system 100 could include one or more DR servers 101, one or more servers 113, one or more calendar servers 151, one or more social network servers 155, one or more client devices 103, one or more endpoints 165, one or more utility servers 178, and one or more power grid systems 195.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or includes portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, WAP, e-mail, etc. In some implementations, the network 105 may include a global positioning system (GPS) satellite for providing GPS navigation to the client devices 103a and 103b. The network 105 may be a mobile data network such as third-generation (3G), fourth-generation (4G), long-term evolution (LTE), Voice-over-LTE ("VoLTE") or any other mobile data network or combination of mobile data networks.

The power grid system 195 may include an electric power distribution network. In some implementations, the power grid system 195 may be communicatively coupled to the network 105 via a signal line 194. The power grid system 195 may supply electric power to the distribution transformer 167 which may re-distribute the electric power to the endpoints 165. The power grid system 195 may supply electric power to multiple distribution transformers 167 in a local area. In some implementations, the power grid system 195 may include one or more sensors (not shown in FIG. 1) that are configured to monitor a status of the power grid system 195. For example, one or more sensors may be configured to monitor a power supply status and a power demand status in the power grid system 195. The sensors may also be configured to provide other functionality in the power grid system 195.

The distribution transformer 167 may transform a voltage used in distribution lines to a level used by end-use customers. The distribution transformer 167 may be communicatively coupled to the power grid system 195 via a signal line 196 for data communication with the power grid system 195. The distribution transformer 167 may be electrically coupled to the power grid system 195 via a power line 168. A power line described herein may represent a wired power supply channel (e.g., electricity lines) or a wireless power supply channel. One or more endpoints 165 may be coupled to the distribution transformer 167 to receive electric power from the power grid system 195.

The endpoint 165 may include an entity that consumes electric power supplied by the distribution transformer 167. For example, the endpoint 165 may include an electricity system in a house that includes lights, an air-conditioning system, a refrigerator, a home charge station, and other household appliances. In another example, the endpoint 165 may include an electricity system in a commercial building. In some implementations, the commercial building may be associated with multiple distribution transformers 167 with each distribution transformer 167 connected to multiple endpoints 165. For example, an electricity system on a floor of a building may be considered as an endpoint 165, and each distribution transformer 167 may supply power to ten endpoints 165 in the building (ten electricity systems on ten floors of the building). Other example endpoints 165 are possible.

The endpoint 165a includes the second client device 103b and the charge station 193. The endpoint 165b may include similar elements as the endpoint 165a. The endpoint 165b may be communicatively coupled to the distribution transformer 167 via a signal line 161. The endpoint 165b may be electrically coupled to the distribution transformer 167 via a power line 163. The endpoint 165b may be communicatively coupled to the network 105 via a signal line 169.

In some implementations, a charge system 191a can be operable on the charge station 193. The charge station 193 may be an infrastructure element that supplies electric power for recharging a battery associated with a client device. For example, the charge station 193 may provide electric power for recharging batteries in all-electric vehicles, neighborhood electric vehicles, or plug-in hybrid electric vehicles. In some implementations, the charge station 193 may be a household charge station. In some other implementations, the charge station 193 may be a public charge station on a street or a parking lot. Other types of charge stations 193 are possible.

In some implementations, the charge station 193 is communicatively coupled to the network 105 via a signal line 106 for communicating with the power grid system 195, the distribution transformer 167, the client devices 103, or other entities of the system 100. Alternatively or additionally, the charge station 193 may be directly coupled to the distribution transformer 167 via a signal line 162. The charge station 193 may be directly coupled to the second client device 103b via a signal line 102. In the illustrated implementation, the charge station 193 is also electrically coupled to the distribution transformer 167 via a power line 164. The charge station 193 is electrically coupled to the second client device 103*b* via a power line 166.

In some implementations, a charge system 191*b* can be operable on the second client device 103*b*. The second client device 103*b* can be a mobile client device, and a battery system 197 can be mounted on or coupled to the mobile client device. For example, the second client device 103*b* can be one of a vehicle (e.g., an automobile, a bus), a bionic implant, or any other mobile system including non-transitory computer electronics and a battery. In some implementations, the second client device 103*b* may include a computing device that includes a memory and a processor. In the illustrated implementation, the second client device 103*b* is communicatively coupled to the network 105 via a signal line 118. The second user 125*b* may interact with the second client device 103*b* via a signal line 122.

In some implementations, the second client device 103*b* may include one or more sensors (not shown in FIG. 1). Example sensors may include, but are not limited to, a navigation sensor (e.g., a GPS sensor), an infrared detector, a motion detector, a thermostat, a sound detector, and any other type of sensors. For example, the second client device 103*b* may include sensors for measuring one or more of a current time, a location (e.g., a latitude, longitude, and altitude of a location), an acceleration of a vehicle, a velocity of a vehicle, a fuel tank level, and a current state of charge (SOC) of the battery system 197, etc. The sensors may generate sensor data describing the measurements and send the sensor data to the charge system 191*b*.

In some implementations, a charge system 191*c* can be operable on the first client device 103*a*. The first client device 103*a* may be a computing device that includes a memory and a processor, for example, a laptop computer, a desktop computer, a tablet computer, a mobile telephone, a personal digital assistant ("PDA"), a mobile e-mail device, a portable game player, a portable music player, a television with one or more processors embedded therein or coupled thereto, or another electronic device capable of accessing the network 105. In some implementations, the charge system 191*c* may act in part as a thin-client application that may be stored on the first client device 103*a* and in part as components that may be stored on one or more of the server 113, the charge station 193, and the second client device 103*b*. In the illustrated implementation, the first client device 103*a* is communicatively coupled to the network 105 via a signal line 108. The first user 125*a* may interact with the first client device 103*a* via a signal line 124.

In some implementations, the first user 125*a* and the second user 125*b* can be the same user 125 interacting with both the first client device 103*a* and the second client device 103*b*. For example, the user 125 can be a passenger or a driver that operates the second client device 103*b* (e.g., a vehicle) and the first client device 103*a* (e.g., a smartphone). In some other implementations, the first user 125*a* and the second user 125*b* may be different users 125 that interact with the first client device 103*a* and the second client device 103*b*, respectively.

In some implementations, a charge system 191*d* can be operable on the server 113. The server 113 can be a hardware server that includes a processor, a memory, and network communication capabilities. In the illustrated implementation, the server 113 is coupled to the network 105 via a signal line 114. The server 113 sends and receives data to and from other entities of the system 100 via the network 105. The server 113 includes a storage device 141 for storing data to provide the functionality described herein. The storage device 141 is described below in more detail.

The charge system 191 (e.g., the charge system 191*a*, 191*b*, 191*c*, or 191*d*) can be a system that provides charging services to mobile client devices. In some implementations, the charge system 191 can be implemented using hardware including a field-programmable gate array ("FPGA") or an application-specific integrated circuit ("ASIC"). In some other implementations, the charge system 191 can be implemented using a combination of hardware and software. The charge system 191 may be stored in a combination of the devices and servers, or in one of the devices or servers. The charge system 191 may be described below in more detail with reference to FIGS. 2-5.

The storage device 141 can be a non-transitory storage medium that stores data for providing the functionality described herein. The storage device 141 may be a dynamic random access memory (DRAM) device, a static random access memory (SRAM) device, flash memory, or some other memory devices. In some implementations, the storage device 141 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some implementations, the storage device 141 stores time synchronicity data, historical journey data, user profile data, power rate data, utility preference data, and any other data for providing the functionality described herein. The historical journey data associated with a user or a mobile client device may describe historical journeys taken by the user or the mobile client device. For example, the historical journey data includes data describing one or more of a start point, an end point, a departure time from the start point, an arrival time at the end point, a route, a journey duration, a direction, and other journey context data associated with a journey taken by the user or the mobile client device.

The user profile data can be data describing user profiles. For example, the user profile data associated with a user includes a user name, an e-mail address, user preferences, hobbies, interests, education, work experience, and other demographic data describing the user. Other example user profile data is possible. In some implementations, the user profile data may include data describing one or more user charging preferences associated with the user. For example, a user charging preference may describe that the user prefers to select a charge schedule that minimizes a charging cost. In another example, a user charging preference may describe that the user is interested in charging a vehicle eco-friendly or charging the vehicle according to government guidelines to receive a potential tax benefit. Alternatively or additionally, the user charging preference may indicate that the user is interested in charging the vehicle in a way that may increase a reward associated with the vehicle. Other examples of user charging preferences are possible.

The power rate data may describe power rates for power usage in different times. For example, the power rate data may include a power rate chart describing how the power rate is changed during different hours in a day.

The utility preference data may include data describing one or more utility charging preferences of a utility service. For example, the utility preference data may describe that a utility service may intend to minimize an impact of vehicle charging on the power grid system 195. In another example, the utility preference data may describe that the utility service may not recommend a user to charge a vehicle during demand peak hours. The utility service may provide a power rate discount to the user if the user charges the vehicle in non-peak hours. Other example utility preference data is possible.

The DR server 101 can be a hardware server that includes a processor, a memory, and network communication capabilities. In the illustrated implementation, the DR server 101 is coupled to the network 105 via a signal line 112. The DR server 101 sends and receives data to and from one or more of the client devices 103, the server 113, the charge station 193, the utility server 178, and the power grid system 195 via the network 105. For example, the DR server 101 sends DR events to the charge system 191 via the network 105.

DR may be described as the changes in electricity usage by end-use customers from their normal consumption patterns in response to changes in the price of electricity over time. DR may also relate to incentive payments designed to induce lower electricity use at times of high wholesale market prices or when the electricity grid is unreliable. DR may include all intentional modifications to consumption patterns of electricity of end-use customers that are intended to alter the timing, level of instantaneous demand, or the total electricity consumption.

In the illustrated implementation, the DR server 101 includes a DR event notification application 111. The DR event notification application 111 can include code and routines for generating and sending DR events to the charge system 191, the utility server 178, the distribution transformer 167, the charge station 193, the power grid system 195, or other entities of the system 100. A DR event may be an event related to demand response in a power grid system 195. For example, a DR event may be an event indicating that: (1) a price for electric power may increase during a certain time period; and (2) the client device 103 is requested to reduce its consumption of electric power under a specific usage amount. A DR event may include a DR event start time and a DR event end time, and a time period between the DR event start time and the DR event end time forms a DR event period.

In some implementations, a DR event includes one or more DR requirements for regulating power usage. For example, a DR event indicates that the power usage between 6:00 PM and 11:00 PM at a user's home may not exceed a predetermined amount of electricity. In another example, a DR event may specify that charging vehicles during a DR event period may not be allowed if power demand in a corresponding regional power grid network may exceed a particular threshold during the DR event period. Other example DR events are possible.

The calendar server 151 can be a hardware server that includes a processor, a memory, and network communication capabilities. In the illustrated implementation, the calendar server 151 is coupled to the network 105 via a signal line 152. The calendar server 151 sends and receives data to and from other entities of the system 100 via the network 105. For example, the calendar server 151 sends data describing a user's calendar to the charge system 191 with permission from the user.

The social network server 155 can be a hardware server that includes a processor, a memory, and network communication capabilities. In the illustrated implementation, the social network server 155 is coupled to the network 105 via a signal line 154. The social network server 155 sends and receives data to and from other entities of the system 100 via the network 105. The social network server 155 includes a social network application 157. A social network can be a type of social structure where the users 125 may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related.

The social network server 155 and the social network application 157 can be representative of one social network and that there may be multiple social networks coupled to the network 105, each having its own server, application, and social graph. For example, a first social network may be more directed to business networking, a second may be more directed to or centered on academics, a third may be more directed to local business, a fourth may be directed to dating, and others may be of general interest or a specific focus.

The utility server 178 can be a hardware server that includes a processor, a memory, and network communication capabilities. In the illustrated implementation, the utility server 178 is coupled to the network 105 via a signal line 172. The utility server 178 sends and receives data to and from other entities of the system 100 via the network 105. For example, the utility server 178 sends data describing power rates in a local area to the charge system 191 and the DR server 101. The utility server 178 may receive data describing an amount of power used to charge a vehicle at the charge station 193 and may determine a charging cost for charging the vehicle. The utility server 178 may automatically add the charging cost to an account associated with a user that operates the vehicle. In some implementations, the utility server 178 may provide preference data describing one or more charging preferences of a utility service. The one or more charging preferences may be configured by an operator or an administrator of the utility service.

Example Charge System

Figure 2:
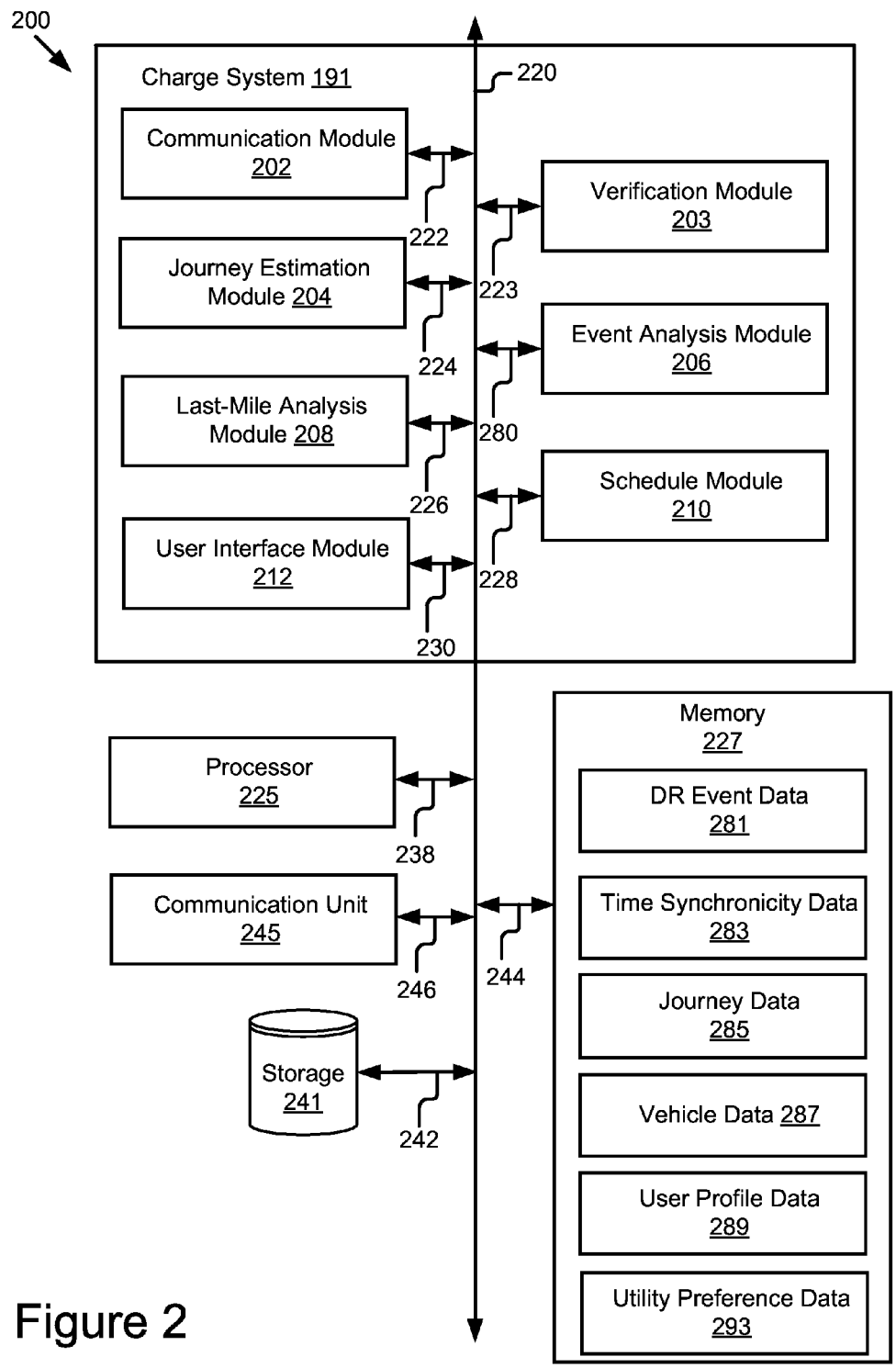
FIG. 2 is a block diagram illustrating an example computing device that includes an example charge system.

Referring now to FIG. 2, an example of the charge system 191 is shown in more detail. FIG. 2 is a block diagram of a computing device 200 that includes the charge system 191, a processor 225, a communication unit 245, a storage device 241, and a memory 227 according to some examples. The components of the computing device 200 are communicatively coupled by a bus 220. In some implementations, the computing device 200 can be one of the server 113, the first client device 103a, the charge station 193, the second client device 103b, and any other entity of the system 100 in FIG. 1.

The processor 225 includes an arithmetic logic unit, a microprocessor, a general-purpose controller, or some other processor array to perform computations and provide electronic display signals to a display device. The processor 225 is coupled to the bus 220 for communication with the other components via a signal line 238. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors 225 may be included. Other processors, operating systems, sensors, displays, and physical configurations may be possible.

The memory 227 stores instructions or data that may be executed by the processor 225. The memory 227 is coupled to the bus 220 for communication with the other components via a signal line 244. The instructions or data may include code for performing the techniques described herein. The memory 227 may be a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2, the memory 227 stores DR event data 281, time synchronicity data 283, journey data 285, vehicle data 287, user profile data 289, and utility preference data 293. The DR event data 281 may include data describing one or more DR events. The journey data 285 may include data describing historical journeys taken by a user or a mobile client device such as a vehicle. The user profile data 289 may include data describing a profile of a user associated with a mobile client device. The user profile data 289 may include one or more user charging preferences. The utility preference data 291 may include data describing one or more utility charging preferences associated with a utility service.

The time synchronicity data 283 may include data used to synchronize a device time with a universal time. For example, the time synchronicity data 283 can be configured to synchronize a local time associated with a vehicle with a universal time. In some implementations, a local time may be synchronized with the Coordinated Universal Time (UTC) defined by International Telecommunications Union Recommendation (ITU-R TF.460-6) according to a corresponding local time zone. In some other implementations, a local time may be synchronized by timekeeping technologies including GPS satellites and a network time protocol (NTP). The network time protocol may include a networking protocol for clock synchronization between computer systems over packet-switched variable-latency data networks.

The vehicle data 287 may include data associated with a vehicle. For example, the vehicle data 287 may include vehicle identification data (e.g., a vehicle identification number), electrical characteristics associated with the battery system 197 of the vehicle (e.g., a voltage range or an ampere rate range for charging the battery system 197, a waveform of the battery system 197, etc.), journey data associated with the vehicle, user charging preferences and utility charging preferences configured for the vehicle, and other example vehicle data.

The communication unit 245 transmits and receives data to and from at least one of the client devices 103, the charge station 193, the server 113, and any other entities of the system 100. The communication unit 245 is coupled to the bus 220 via a signal line 246. In some implementations, the communication unit 245 includes a port for direct physical connection to the network 105 or to another communication channel. For example, the communication unit 245 includes a USB, SD, CAT-5, or similar port for wired communication with the client devices 103 or the server 113. In some implementations, the communication unit 245 includes a wireless transceiver for exchanging data with the client devices 103 or other communication channels using one or more wireless communication methods, including IEEE 802.11, IEEE 802.16, BLUETOOTH®, or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

The storage device 241 can be a non-transitory storage medium that stores data for providing the functionality described herein. The storage device 241 may be a dynamic random access memory (DRAM) device, a static random access memory (SRAM) device, flash memory, or some other memory devices. In some implementations, the storage device 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The storage device 241 is communicatively coupled to the bus 220 via a signal line 242. The storage device 241 may also store data that was temporarily stored in the memory 227.

In the illustrated implementation shown in FIG. 2, the charge system 191 includes a communication module 202, a verification module 203, a journey estimation module 204, an event analysis module 206, a last-mile analysis module 208, a schedule module 210, and a user interface module 212. These components of the charge system 191 are communicatively coupled to each other via the bus 220.

In some implementations, components of the charge system 191 can be stored in a single server or device. In some other implementations, components of the charge system 191 can be distributed and stored across multiple servers or devices. For simplicity and convenience purpose, the various components of the charge system 191 in FIG. 2 are described below with reference to a vehicle, which is an example of a mobile client device. However, the description is not intended to limit the scope of the disclosure, and the description is also applicable to other examples of mobile client devices. Furthermore, the separation of various components, modules, and servers in the implementations described herein should not be understood as requiring such separation in all implementations, and in some implementations the described components, modules, devices, or servers can generally be integrated together in a single component, module, device, or server.

In some implementations, each component of the charge system 191 (e.g., the module 202, 203, 204, 206, 208, 210, or 212) can be stored in the memory 227 of the computing device 200 and can be accessible and executable by the processor 225. Each component of the charge system 191 may be adapted for cooperation and communication with the processor 225 and other components of the computing device 200 via the bus 220.

The communication module 202 can be software including code and routines for handling communications between the charge system 191 and other components of the computing device 200. The communication module 202 may be coupled to the bus 220 via a signal line 222. The communication module 202 sends and receives data, via the communication unit 245, to and from one or more of the client device 103, the server 113, the DR server 101, the calendar server 151, the social network server 155, the charge station 193, the utility server 178, and the power grid system 195 depending upon where the charge system 191 is stored. For example, the communication module 202 receives, via the communication unit 245, calendar data associated with a user from the calendar server 151 and sends the calendar data to the journey estimation module 204. In another example, the communication module 202 receives graphical data for providing a user interface to a user from the user interface module 212 and sends the graphical data to the client device 103, causing the client device 103 to present the user interface to the user.

In some implementations, the communication module 202 receives data from components of the charge system 191 and stores the data in one or more of the storage device 241 and the memory 227. For example, the communication module 202 receives data describing a charge schedule from the schedule module 210 and stores the data in the storage device 241 or the memory 227. In some implementations, the communication module 202 retrieves data from the storage device 241 or the memory 227 and sends the data to one or more components of the charge system 191. For example, the communication module 202 receives the journey data 285 from the memory 227 and sends the journey data 285 to the journey estimation module 204.

In some implementations, the communication module 202 may handle communications between components of the charge system 191. For example, the communication module 202 receives data describing a charge schedule from the schedule module 210 and sends the data to the user interface module 212 for generating a user interface to present the charge schedule to a user for approval.

The verification module 203 can be software including routines for verifying one or more electrical characteristics associated with the battery system 197 in the vehicle. The verification module 203 may be coupled to the bus 220 via a signal line 223. In some implementations, the verification module 203 may detect that a vehicle is electrically connected to the charge station 193. For example, the verification module 203 receives sensor data from one or more sensors in the vehicle or the charge station 193 and determines that the vehicle is wirelessly connected to the charge station 193 based on the sensor data. The vehicle is ready to be charged wirelessly by the charge station 193. In another example, the verification module 203 determines that the vehicle is connected to the charge station 193 using a power cord. The vehicle is ready to be charged by the charge station 193 using the power cord.

The verification module 203 receives a device identity (ID) identifying the vehicle and a battery ID identifying the battery system 197 from the vehicle. The verification module 203 receives one or more electrical characteristics of the battery system 197 from the vehicle. Example electrical characteristics associated with the battery system 197 may include, but are not limited to, a current state of charge for the battery system 197, a maximum ampere rate for charging the battery system 197, a range of voltages used to charge the battery system 197, a lag time associated with the battery system 197, waveform characteristics associated with the battery system 197, an ambient temperature surrounding the battery system 197, a battery temperature, and information describing other electrical characteristics of the battery system 197. A state of charge may indicate a charge level of the battery system 197. For example, a state of charge indicates that the battery system 197 is 80% charged. The lag time describes a charge delay time for the battery system 197. For example, the lag time describes an amount of time needed for the battery system 197 to start charging after applying a voltage to terminals of the battery system 197.

The verification module 203 may verify the one or more electrical characteristics of the battery system 197 as a safety precaution before charging the battery system 197. For example, the verification module 203 uses the lag time and waveform characteristics to identify a type of the battery system 197. The verification module 203 then verifies that a current ampere rate to charge the battery system 197 is not greater than a maximum ampere rate for the type of the battery system 197 and a voltage applied to the battery system 197 falls within a voltage range for the type of the battery system 197.

In some implementations, the verification module 203 may verify one or more user charging preferences associated with a user. The user may include a driver that operates the vehicle, a passenger in the vehicle, an owner of the vehicle, or another user associated with the vehicle. The verification module 203 may also verify one or more utility charging preferences associated with a utility service. For example, the verification module 203 may retrieve vehicle data associated with the vehicle and may verify one or more user charging preferences and one or more utility charging preferences based on the vehicle data.

The journey estimation module 204 can be software including routines for estimating a future journey for a vehicle associated with a user. The journey estimation module 204 may be coupled to the bus 220 via a signal line 224. In some implementations, the journey estimation module 204 receives historical journey data associated with the vehicle or the user from the memory 227 or the storage device 241 and estimates a future journey for the vehicle based on the historical journey data. For example, the journey estimation module 204 estimates a departure time, a destination, a journey duration, a travel route, and other journey context data associated with the future journey. In a further example, if the historical journey data indicates that the user usually drives to work from home between 8:00 AM and 8:30 AM in weekdays, the journey estimation module 204 estimates a departure time for a future journey in a weekday morning as 8:00 AM and a destination for the future journey as a work location associated with the user.

In some implementations, the journey estimation module 204 receives time synchronicity data from the memory 227 and determines a synchronized local time associated with the vehicle based on the time synchronicity data. The journey estimation module 204 receives weather data from a weather server (not shown), calendar data from the calendar server 151, and social network data from the social network server 155. The journey estimation module 204 determines a future journey including a departure time of the future journey for the vehicle based on one or more of the synchronized local time, the weather data, the calendar data, and the social network data. For example, if the calendar data indicates that the user has a doctor appointment at 9:00 AM in a next morning and a travel time from home to the doctor's office is less than half an hour, the journey estimation module 204 may estimate a departure time from home in the next morning as 8:30 AM. However, if the weather data indicates that there may be a snow storm in the next morning, the journey estimation module 204 may estimate the departure time in the next morning as 8:15 AM in case the user leaves home earlier and needs more time to travel to the doctor's office due to the snow storm.

In some implementations, the user may input data describing one or more future journeys (e.g., one or more departure times and one or more destinations for the one or more future journeys) using a user interface. The journey estimation module 204 stores the data inputted by the user in the memory 227 or the storage device 241.

In some implementations, the journey estimation module 204 sends data describing the future journey to one or more of the last-mile analysis module 208 and the schedule module 210. In some other implementations, the journey estimation module 204 stores the data in the storage device 241 or the memory 227.

The event analysis module 206 can be software including routines for analyzing DR events. The event analysis module 206 may be coupled to the bus 220 via a signal line 280. The event analysis module 206 receives DR event data describing one or more DR events from the DR event notification application 111. The DR event data may include time-of-use pricing data, peak time rebate data, direct load control, and other DR event data. The event analysis module 206 may determine one or more DR event requirements based on the DR event data. For example, during a direct load control, the utility server 178 may remotely control operation of certain appliances in a household. The utility server 178 may select to turn off some types of appliances in the household. A DR requirement may include data indicating which appliances in the household to be turned off. For example, during a direct load control period an air-conditioning system in a house may be turned off since a vehicle is charged in the house. In some implementations, a user may configure which appliances to be turned off during a direct load control period.

In some implementations, the event analysis module 206 analyzes the DR event data to determine one or more DR event periods. The one or more DR event periods may occur after a charging connection time and before the departure time. The charging connection time may indicate a time when the battery system 197 is connected to a power source such as the charge station 193 and is ready to be charged by the charge station 193. In some implementations, a DR requirement may indicate that a vehicle may not be charged during the one or more DR event periods since the one or more DR event periods may represent one or more peak demand periods. Each DR event period may include a corresponding event start time and a corresponding event end time. The event analysis module 206 may also determine one or more available charging periods based on the DR event data. The one or more available charging periods may be one or more time slots during which the vehicle may be charged. A DR requirement may also include the one or more available charging periods for charging the vehicle.

For example, assume a vehicle is connected to a power outlet at home at 5:00 PM. The vehicle is estimated to depart from home at 8:00 AM in the next morning. The DR event data indicates that a DR event period starts from 8:00 PM and lasts until 12:00 AM in the midnight. The event analysis module 206 determines a first available charging period as a time period from 5:00 PM to 8:00 PM, a DR event period as a time period from 8:00 PM to 12:00 AM, and a second available charging period as a time period from 12:00 AM to 8:00 AM in the next morning.

In some implementations, the event analysis module 206 sends data describing the one or more DR requirements to the schedule module 210. In some other implementations, the event analysis module 206 stores data describing the one or more DR requirements in the memory 227 or the storage device 241.

The last-mile analysis module 208 can be software including routines for managing power usage in a last-mile distribution network. The last-mile analysis module 208 may be coupled to the bus 220 via a signal line 226. A last-mile distribution network may include a distribution transformer 167 and endpoints 165 connected to the distribution transformer 167. Power in the last-mile distribution network may be distributed from the distribution transformer 167 to the endpoints 165.

In some implementations, the last-mile analysis module 208 may determine a geographic region associated with a vehicle based on GPS data, map data, or user profile data that describes a user's home address or work address. The last-mile analysis module 208 may group endpoints 165 in the geographic region into last-mile distribution networks so that each last-mile distribution network may include a distribution transformer and a set of endpoints electrically connected to the distribution transformer. The last-mile analysis module 208 determines a first endpoint associated with the vehicle. For example, the last-mile analysis module 208 identifies a home or a parking lot where the vehicle is located and connected to a charge station. The last-mile analysis module 208 determines a last-mile distribution network that includes the first endpoint associated with the vehicle.

The last-mile analysis module 208 determines one or more last-mile power usage factors in the last-mile distribution network. Example last-mile power usage factors for a last-mile distribution network may include, but are not limited to, a current total load in a last-mile distribution network, a maximum total load allowed in the last-mile distribution network, a current usage trend in the last-mile distribution network (e.g., an increasing or decreasing usage trend), a current load of each endpoint in the last-mile distribution network, a maximum load of each endpoint in the last-mile distribution network, and other usage factors. In some implementations, a user (e.g., an operator or an administrator) may manually configure the one or more last-mile power usage factors. Alternatively, the last-mile analysis module 208 may automatically determine the one or more last-mile power usage factors and may present the one or more last-mile power usage factors to the user for verification.

In some implementations, the last-mile analysis module 208 may perform a negotiation process between endpoints in the last-mile distribution network to keep a total load (e.g., a total amount of power usage) in the last-mile distribution network below a threshold. The threshold may be equal to or smaller than the maximum total load of the last-mile distribution network. The threshold may be configured by an administrator or an operator associated with the last-mile distribution network. The negotiation process may allow endpoints in the last-mile distribution network to cooperate with each other and to negotiate power distribution within the last-mile distribution network. During the negotiation process, endpoints in the last-mile distribution network may communicate with each other to satisfy their respective power consumption needs while keeping a total load in the last-mile distribution network below the threshold.

For example, assume that a vehicle associated with a first endpoint needs to be charged immediately because a user may drive the vehicle in one hour. However, a current total load in the last-mile distribution network is close to the threshold and the last-mile distribution network may not tolerate an additional load placed by charging the vehicle. The first endpoint may send a prioritized signal to the last-mile analysis module 208, where the prioritized signal indicates a priority to charge the vehicle during a time period from now to one hour later. The last-mile analysis module 208 may forward the prioritized signal to other endpoints in the last-mile distribution network. One or more other endpoints may agree to reduce their power consumption during the time period responsive to receiving the prioritized signal.

The last-mile analysis module 208 may determine one or more second endpoints from the last-mile distribution network that agree to reduce their power consumption during the time period. The last-mile analysis module 208 estimates an amount of power saved by the one or more second endpoints during the time period and generates a negotiation result that includes the amount of power. The amount of power saved by the one or more second endpoints may be used by the schedule module 210 to charge the vehicle during the time period so that the total load in the last-mile distribution network keeps below the threshold. The last-mile analysis module 208 may increase one or more existing reward values associated with the one or more second endpoints as rewards for reducing power consumption during the time period. The last-mile analysis module 208 may reduce an existing reward value associated with the first endpoint as a cost for sending the prioritized signal and charging the vehicle immediately.

In some implementations, the last-mile analysis module 208 may send the one or more last-mile power usage factors and the negotiation result to the schedule module 210. Alternatively or additionally, the last-mile analysis module 208 may store the one or more last-mile power usage factors and the negotiation result in the storage device 241 or the memory 227.

The schedule module 210 can be software including routines for determining a charge schedule for a vehicle. The schedule module 210 may be coupled to the bus 220 via a signal line 228. In some implementations, the schedule module 210 determines a current state of charge for the battery system 197 at a charge connection time when the vehicle is connected to the charge station 193. The schedule module 210 determines a charge completion time for the vehicle so that the charging of the vehicle may complete at the charge completion time. The charge completion time may be a time no later than the departure time of the future journey. For example, the charge completion time may be ten minutes earlier than the departure time. In some implementations, the charge completion time may be determined by the user. Alternatively, the charge completion time may be determined automatically by the schedule module 210 based on the departure time of the future journey.

The schedule module 210 determines a target state of charge for the battery system 197 at the charge completion time. The target state of charge may be a state of charge that the battery system 197 aims to achieve at the charge completion time. The target state of charge satisfies a usage requirement of the vehicle. For example, the schedule module 210 determines the target state of charge based on one or more estimated future journeys associated with the user, where the user is estimated to take the one or more future journeys before recharging the battery system 197 again. The target state of charge of the battery system 197 may be configured such that the vehicle has sufficient power to complete at least the one or more future journeys.

For example, if the one or more future journeys indicate that the user will drive the vehicle to work and a grocery store tomorrow, the schedule module 210 may determine the target state of charge for the battery system 197 as 70% full of the battery system 197. The 70%-full battery system 197 may have sufficient power for the user to drive the vehicle from home to work, from work to the grocery store, and then back to home from the grocery store.

The target state of charge may also be configured such that a state of charge of the battery system 197 after completion of the one or more future journeys may be no less than a threshold. For example, after completion of the one or more journeys, the battery system 197 does not deplete and may still have a state of charge no less than 15% full of the battery system 197. Alternatively, the target state of charge may be configured by the user associated with the vehicle.

The schedule module 210 may receive one or more DR requirements from the event analysis module 206, one or more last-mile power usage factors and a negotiation result from the last-mile analysis module 208. Alternatively or additionally, the schedule module 210 receives data describing one or more user charging preferences and data describing one or more utility charging preferences. The schedule module 210 may determine a charge schedule for the vehicle based on one or more of the DR requirements, the last-mile power usage factors, the negotiation result, the user charging preferences, and the utility charging preferences as described below.

A charge schedule for charging a vehicle may describe when and how to charge the vehicle. For example, the charge schedule may include a charge start time, a charge completion time, and a charging voltage or an ampere rate applied to charge the vehicle. In another example, the charge schedule may include one or more time slots used to charge the vehicle and one or more voltages or ampere rates configured to charge the vehicle during the one or more time slots. The charge schedule may include other data for charging the vehicle.

In some implementations, the schedule module 210 may determine a charge schedule that satisfies a user charging preference and a utility charging preference. For example, the user charging preference may indicate that a user prefers to minimize a charging cost, and the utility charging preference may indicate that a utility service intends to minimize an impact of the vehicle charging on a power grid. The schedule module 210 may determine a charge schedule that includes charging time slots with lowest power rates in non-peak hours so that a corresponding charging cost may be minimized and the power grid may not be overloaded by the charging of the vehicle. Alternatively or additionally, the schedule module 210 may determine individualized charge schedules for a number of vehicles in the same geographic region so that load on a power grid in the geographic region caused by vehicle charging may be balanced. The load in the power grid may be balanced by charging at least some of the vehicles during non-peak time periods.

In some implementations, the utility charging preference may be represented as one or more DR requirements. The schedule module 210 may determine a charge schedule that satisfies the one or more DR requirements. For example, the schedule module 210 may determine a charge schedule that does not charge the vehicle during DR event periods and may charge the vehicle during one or more available charging time slots outside the DR event periods. The one or more available charging time slots may be associated with lowest power rates.

In some implementations, the vehicle may be associated with a first endpoint in a last-mile distribution network. The schedule module 210 may determine a charge schedule for the vehicle based on one or more last-mile power usage factors of the last-mile distribution network and a negotiation result from a negotiation process between endpoints in the last-mile distribution network. For example, the charge schedule may include charging time slots during which a total load in the last-mile distribution network is below a threshold. In another example, the charge schedule may delay charging of the vehicle if a current total load in the last-mile distribution network approaches the threshold. In yet another example, the negotiation result may include an amount of power saved by other endpoints during a time period, and the charge schedule may use the amount of power saved by other endpoints to charge the vehicle in the first endpoint during the time period so that a total load in the last-mile distribution network may keep below the threshold during the time period.

The schedule module 210 may charge the battery system 197 in the vehicle based on the charge schedule. For example, the schedule module 210 charges the battery system 197 using one or more charging time slots and one or more charge speeds specified in the charge schedule. In some implementations, the schedule module 210 may charge the battery system 197 to the target state of charge. The schedule module 210 may electronically disconnect the battery system 197 from the charge station 193 after the battery system 197 achieves the target state of charge.

The user interface module 212 can be software including routines for generating graphical data for providing user interfaces. The user interface module 212 may be coupled to the bus 220 via a signal line 230. In some implementations, the user interface module 212 generates graphical data for providing a user interface that depicts one or more charge schedules for a user. The user interface module 212 sends the graphical data to the client device 103 (e.g., a smartphone, a tablet, etc.), causing the client device 103 to present the user interface to the user. The user may configure or select a charge schedule using the user interface. The user interface module 212 may generate graphical data for providing other user interfaces to users.

Methods

Figure 3:
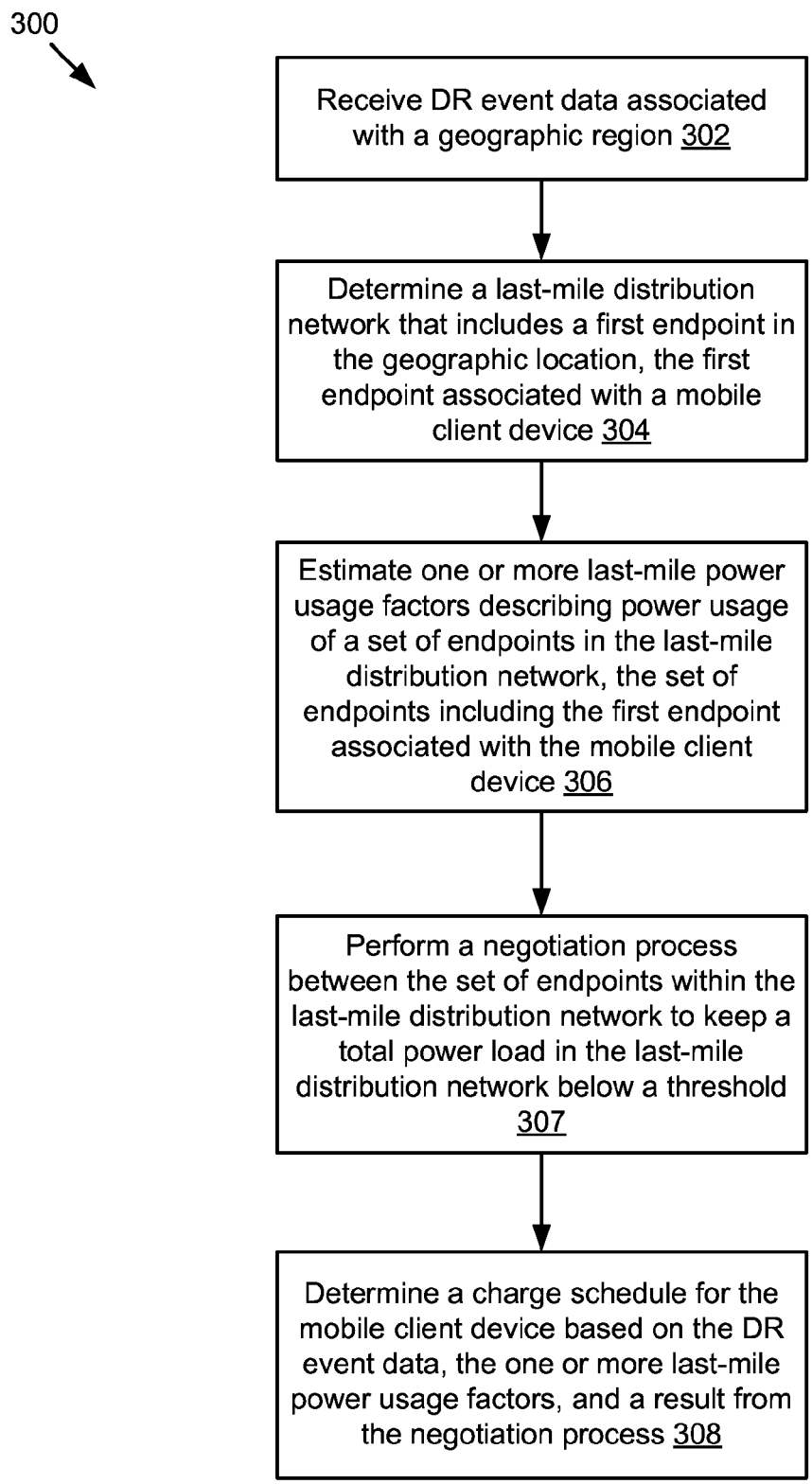
FIG. 3 is a flowchart of an example method for providing charging services to mobile client devices.

Referring now to FIG. 3, an example of a method 300 for providing charging services to mobile client devices is described. In some implementations, the communication module 202 receives 302 DR event data associated with a geographic region from the utility server 178. The last-mile analysis module 208 determines 304 a last-mile distribution network in the geographic region, where the last-mile distribution network includes a first endpoint associated with a mobile client device. The mobile client device may include a vehicle. The last-mile analysis module 208 estimates 306 one or more last-mile power usage factors describing power usage of a set of endpoints in the last-mile distribution network. The set of endpoints includes the first endpoint associated with the mobile client device. The last-mile analysis module 208 performs 307 a negotiation process between the set of endpoints within the last-mile distribution network to keep a total power load in the last-mile distribution network below a threshold. The schedule module 210 determines 308 a charge schedule for the mobile client device based on one or more of the DR event data, the one or more last-mile power usage factors, and a negotiation result from the negotiation process.

Figure 4A:
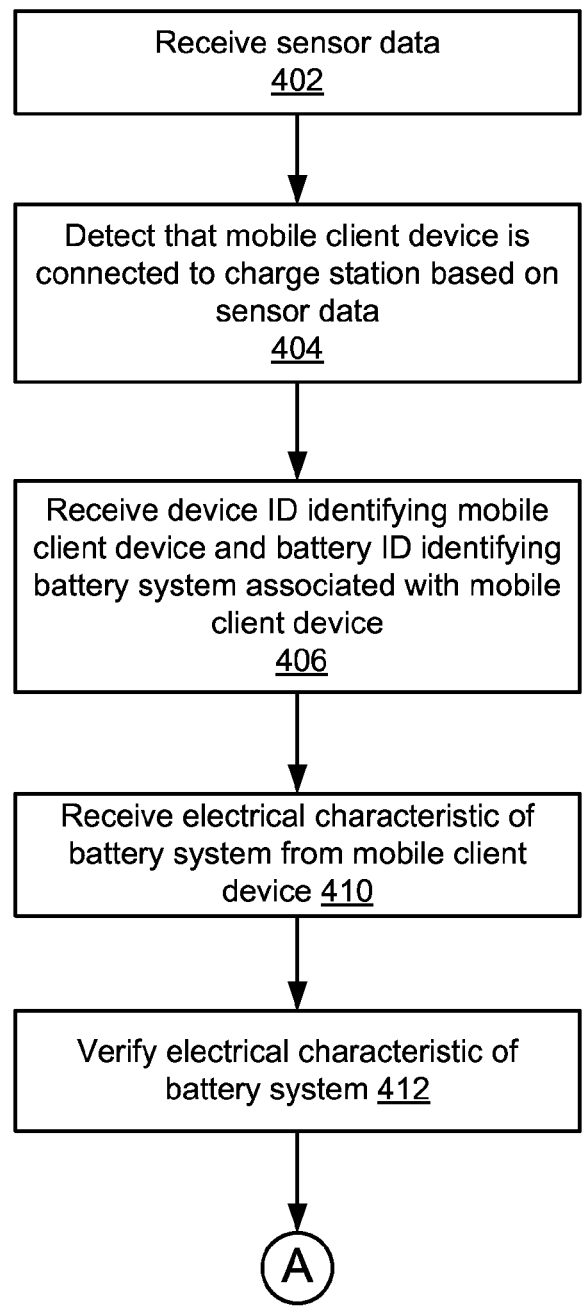
FIGS. 4A-4C are flowcharts of another example method for providing charging services to mobile client devices.
Figure 4B:
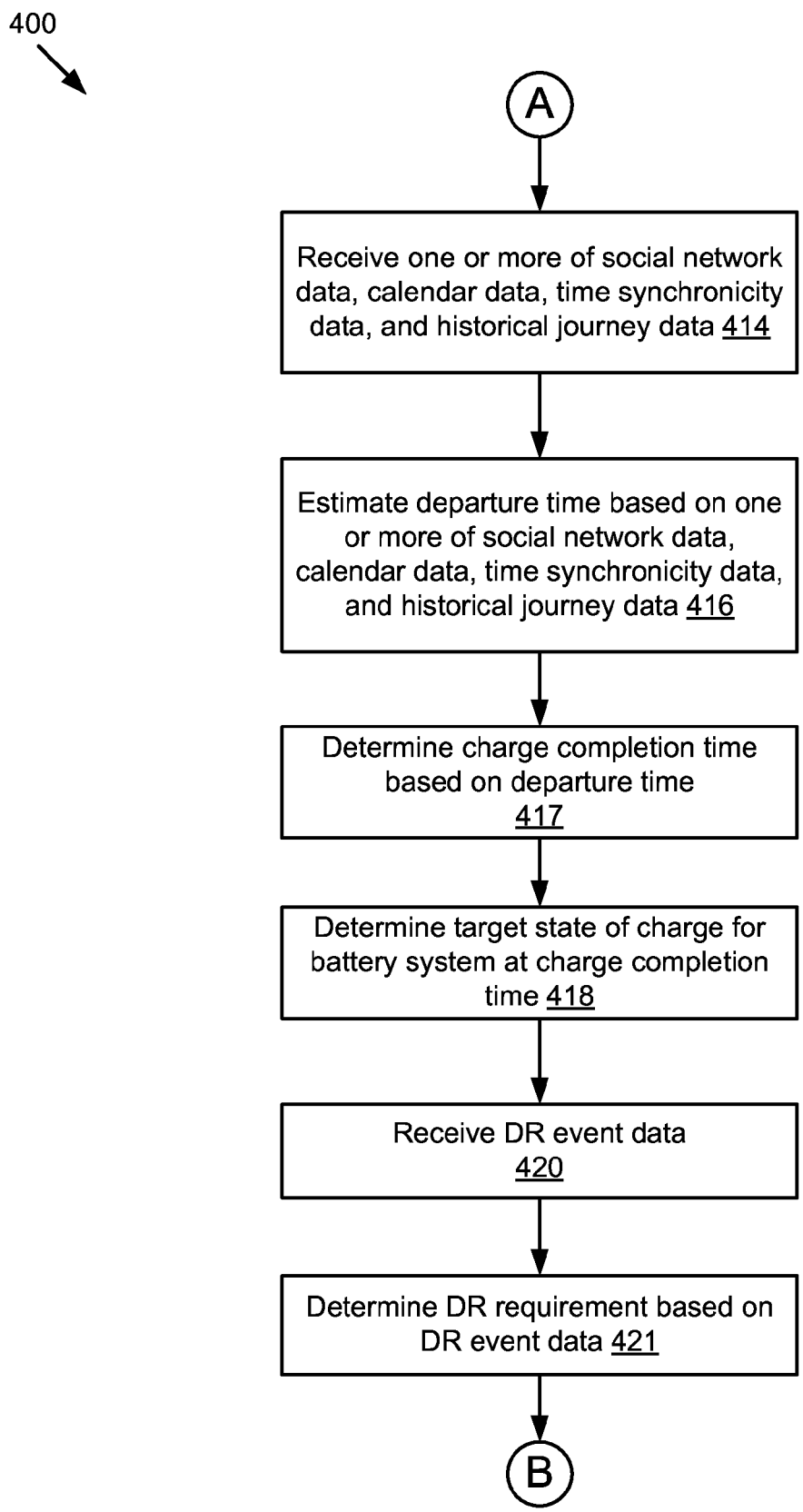
Figure 4C:
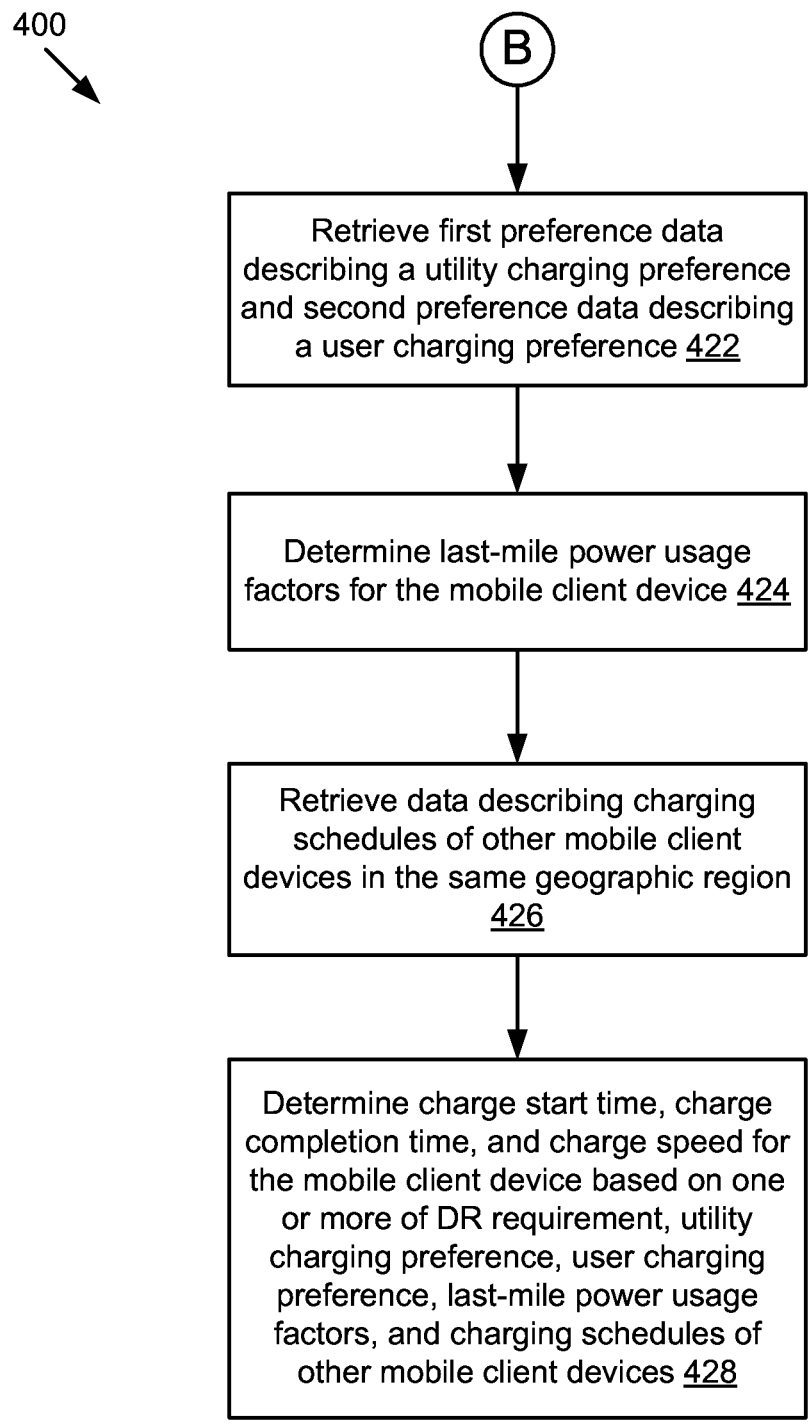

FIGS. 4A-4C are flowcharts of another example method 400 for providing charging services to mobile client devices according to some implementations. Referring to FIG. 4A, the communication module 202 receives 402 sensor data from one or more sensors of a mobile client device. The verification module 203 detects 404 that the mobile client device is connected to a charge station (e.g., the charge station 193) based on the sensor data. The communication module 202 receives 406 a device ID identifying the mobile client device and a battery ID identifying a battery system (e.g., the battery system 197) associated with the mobile client device. The communication module 202 receives 410 one or more electrical characteristics of the battery system from the mobile client device. The verification module 203 verifies 412 the one or more electrical characteristics of the battery system.

Referring to FIG. 4B, the communication module 202 receives 414 one or more of social network data, calendar data, time synchronicity data, and historical journey data associated with a user operating the mobile client device. The journey estimation module 204 estimates 416 a departure time of a future journey associated with the user based on one or more of the social network data, the calendar data, the time synchronicity data, and the historical journey data. The schedule module 210 determines 417 a charge completion time based on the departure time. The schedule module 210 determines 418 a target state of charge for the battery system at the charge completion time or the departure time. The communication module 202 receives 420 DR event data from the DR server 101. The schedule module 210 determines 421 one or more DR requirements based on the DR event data.

Referring to FIG. 4C, the communication module 202 retrieves 422 first preference data describing a utility charging preference and second preference data describing a user charging preference. The last-mile analysis module 208 determines 424 one or more last-mile power usage factors for a last-mile distribution network associated with the mobile client device. The communication module 202 retrieves 426 data describing charge schedules of other mobile client devices in the same geographic region as the mobile client device. The schedule module 210 determines 428 a charge schedule that includes a charge start time, a charge completion time, and a charge speed for the mobile client device based on one or more of the DR requirements, the utility charging preference, the user charging preference, the one or more last-mile power usage factors, and the charge schedules of other mobile client devices in the same geographic region. The charge schedules for the mobile client devices in the same geographic region may be configured such that: (1) the power grid in the geographic region does not overload due to the charging of the mobile client devices; and (2) the mobile client devices may be charged for less expense.

Figure 5:
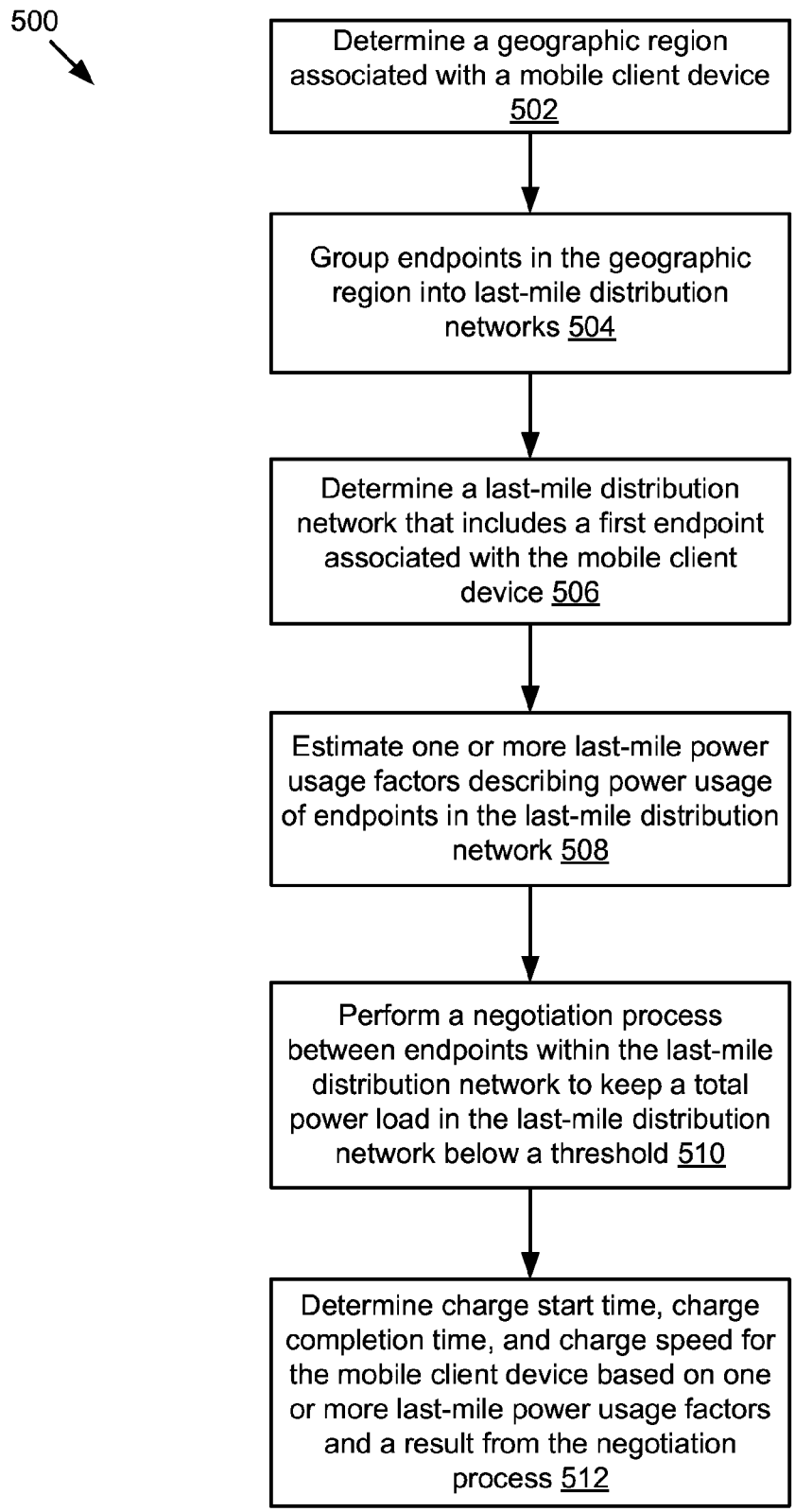
FIG. 5 is a flowchart of yet another example method for providing charging services to mobile client devices.

FIG. 5 is a flowchart of yet another example method 500 for providing charging services to mobile client devices according to some implementations. The last-mile analysis module 208 determines 502 a geographic region associated with a mobile client device. The last-mile analysis module 208 groups 504 endpoints in the geographic region into last-mile distribution networks. Each last-mile distribution network may include a set of endpoints and a distribution transformer. The last-mile analysis module 208 determines 506 a last-mile distribution network that includes a first endpoint associated with the mobile client device. The last-mile analysis module 208 estimates 508 one or more last-mile power usage factors describing power usage of endpoints in the last-mile distribution network. The last-mile analysis module 208 performs 510 a negotiation process between the endpoints in the last-mile distribution network to keep a total power load (e.g., a total amount of power consumed by the endpoints) in the last-mile distribution network below a threshold. The schedule module 210 determines 512 a charge schedule that includes a charge start time, a charge completion time, and a charge speed for charging the mobile client device based on the one or more last-mile power usage factors and a negotiation result from the negotiation process.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method implemented by a charge station of a first endpoint, the method comprising:
   receiving demand response event data associated with a geographic region;
   determining a last-mile distribution network that includes the first endpoint in the geographic region, the first endpoint associated with a mobile client device;
   estimating one or more last-mile power usage factors describing power usage of a set of endpoints in the last-mile distribution network, the set of endpoints including the first endpoint associated with the mobile client device;
   determining a charge schedule for the mobile client device based on the demand response event data and the one or more last-mile power usage factors;
   measuring one or more electrical characteristics of a battery system of the mobile client device responsive to detecting that the mobile client device is electrically connected to the charge station, wherein the one or more electrical characteristics includes a lag time;
   verifying the one or more electrical characteristics of the battery system to confirm an identity of the battery system of the mobile client device and a type of the battery system as a safety precaution before charging the battery system, wherein the lag time is used to identify the type of the battery system; and
   charging, by the charge station, the battery system of the mobile client device based on the charge schedule responsive to (1) detecting that the mobile client device is electrically connected to the charge station and (2) verifying that the one or more electrical characteristics of the battery system confirms the identity of the battery system of the mobile client device and the type of the battery system.

2. The method of claim 1, further comprising:
   receiving data describing a utility charging preference of a utility service;
   receiving data describing a user charging preference of a user associated with the mobile client device; and
   determining the charge schedule for the mobile client device further based on the utility charging preference and the user charging preference.

3. The method of claim 1, further comprising:
   performing a negotiation process between the set of endpoints within the last-mile distribution network to keep a total load in the last-mile distribution network below a threshold; and
   determining the charge schedule further based on a negotiation result from the negotiation process.

4. The method of claim 3, wherein performing the negotiation process between the set of endpoints within the last-mile distribution network comprises:
   receiving a prioritized signal from the first endpoint associated with the mobile client device, the prioritized signal indicating to charge the mobile client device during a time period;
   determining a second endpoint in the last-mile distribution network that agrees to reduce power usage during the time period responsive to the prioritized signal;
   estimating an amount of power saved by the second endpoint during the time period; and
   generating the negotiation result that includes the amount of power saved by the second endpoint.

5. The method of claim 4, wherein the charge schedule uses the amount of power saved by the second endpoint to charge the mobile client device.

6. The method of claim 4, further comprising:
   increasing a first reward value associated with the second endpoint based on the amount of power saved by the second endpoint; and
   reducing a second reward value associated with the first endpoint based on the amount of power.

7. The method of claim 1, wherein the demand response event data includes time-of-use pricing data, peak time rebate data, and direct load control data.

8. A system of a vehicle comprising:
   one or more processors of an onboard vehicle computer included in the vehicle;
   one or more non-transitory tangible computer readable mediums of the vehicle communicatively coupled to the one or more processors and storing executable instructions executable by the one or more processors to perform operations comprising:
      receiving demand response event data associated with a geographic region;
      determining a last-mile distribution network that includes a first endpoint in the geographic region, the first endpoint associated with a mobile client device;
      estimating one or more last-mile power usage factors describing power usage of a set of endpoints in the last-mile distribution network, the set of endpoints including the first endpoint associated with the mobile client device;
      determining a charge schedule for the mobile client device based on the demand response event data the one or more last-mile power usage factors;
      measuring one or more electrical characteristics of a battery system of the mobile client device responsive to detecting that the mobile client device is electrically connected to a charge station, wherein the one or more electrical characteristics includes a lag time;
      verifying the one or more electrical characteristics of the battery system to confirm an identity of the battery system of the mobile client device and a type of the battery system as a safety precaution before charging the battery system, wherein the lag time is used to identify the type of the battery system; and
      charging the battery system of the mobile client device based on the charge schedule responsive to (1) detecting that the mobile client device is electrically connected to the charge station and (2) verifying that the one or more electrical characteristics of the battery system confirms the identity of the battery system of the mobile client device and the type of the battery system.

9. The system of claim 8, wherein the instructions executable by the one or more processors perform operations further comprising:

receiving data describing a utility charging preference of a utility service;
receiving data describing a user charging preference of a user associated with the mobile client device; and
determining the charge schedule for the mobile client device further based on the utility charging preference and the user charging preference.

10. The system of claim 8, wherein the instructions executable by the one or more processors perform operations further comprising:
performing a negotiation process between the set of endpoints within the last-mile distribution network to keep a total load in the last-mile distribution network below a threshold; and
determining the charge schedule further based on a negotiation result from the negotiation process.

11. The system of claim 10, wherein the instructions executable by the one or more processors perform the negotiation process between the set of endpoints within the last-mile distribution network by:
receiving a prioritized signal from the first endpoint associated with the mobile client device, the prioritized signal indicating to charge the mobile client device during a time period;
determining a second endpoint in the last-mile distribution network that agrees to reduce power usage during the time period responsive to the prioritized signal;
estimating an amount of power saved by the second endpoint during the time period; and
generating the negotiation result that includes the amount of power saved by the second endpoint.

12. The system of claim 11, wherein the charge schedule uses the amount of power saved by the second endpoint to charge the mobile client device.

13. The system of claim 11, wherein the instructions executable by the one or more processors perform operations further comprising:
increasing a first reward value associated with the second endpoint based on the amount of power saved by the second endpoint; and
reducing a second reward value associated with the first endpoint based on the amount of power.

14. The system of claim 8, wherein the demand response event data includes time-of-use pricing data, peak time rebate data, and direct load control data.

15. A computer program product comprising a non-transitory computer-usable medium including a computer-readable program, wherein the computer-readable program when executed on a computer of a charge station causes the computer to:
receive demand response event data associated with a geographic region;
determine a last-mile distribution network that includes a first endpoint in the geographic region, the first endpoint associated with a mobile client device;
estimate one or more last-mile power usage factors describing power usage of a set of endpoints in the last-mile distribution network, the set of endpoints including the first endpoint associated with the mobile client device;
determine a charge schedule for the mobile client device based on the demand response event data the one or more last-mile power usage factors;
measure one or more electrical characteristics of a battery system of the mobile client device responsive to detecting that the mobile client device is electrically connected to the charge station, wherein the one or more electrical characteristics includes a lag time;
verify the one or more electrical characteristics of the battery system to confirm an identity of the battery system of the mobile client device and a type of the battery system as a safety precaution before charging the battery system, wherein the lag time is used to identify the type of the battery system; and
charge, by the charge station, the battery system of the mobile client device based on the charge schedule responsive to (1) detecting that the mobile client device is electrically connected to the charge station and (2) verifying that the one or more electrical characteristics of the battery system confirms the identity of the battery system of the mobile client device and the type of the battery system.

16. The computer program product of claim 15, wherein the computer-readable program when executed on the computer further causes the computer to:
receive data describing a utility charging preference of a utility service;
receive data describing a user charging preference of a user associated with the mobile client device; and
determine the charge schedule for the mobile client device further based on the utility charging preference and the user charging preference.

17. The computer program product of claim 15, wherein the computer-readable program when executed on the computer further causes the computer to:
perform a negotiation process between the set of endpoints within the last-mile distribution network to keep a total load in the last-mile distribution network below a threshold; and
determine the charge schedule further based on a negotiation result from the negotiation process.

18. The computer program product of claim 17, wherein performing the negotiation process between the set of endpoints within the last-mile distribution network comprises:
receiving a prioritized signal from the first endpoint associated with the mobile client device, the prioritized signal indicating to charge the mobile client device during a time period;
determining a second endpoint in the last-mile distribution network that agrees to reduce power usage during the time period responsive to the prioritized signal;
estimating an amount of power saved by the second endpoint during the time period; and
generating the negotiation result that includes the amount of power saved by the second endpoint.

19. The computer program product of claim 18, wherein the charge schedule uses the amount of power saved by the second endpoint to charge the mobile client device.

20. The computer program product of claim 18, wherein the computer-readable program when executed on the computer further causes the computer to:
increase a first reward value associated with the second endpoint based on the amount of power saved by the second endpoint; and
reduce a second reward value associated with the first endpoint based on the amount of power.

21. The method of claim 1, wherein the one or more electrical characteristics further includes a waveform characteristic and wherein confirming the type of the battery system is further based on the waveform characteristic of the battery system.

22. The method of claim 1, wherein the lag time describes a charge delay time for the battery system.

* * * * *